United States Patent
Lieberman et al.

(10) Patent No.: US 10,223,131 B1
(45) Date of Patent: Mar. 5, 2019

(54) IMPLEMENTING CONTINUES PAAS APPS RESOURCE OPTIMIZATION USING PRODUCTION WORKLOAD REPLAY WITH INTELLIGENT CONFIGURATION PERMUTATIONS

(71) Applicant: EMC Corporation, Hopkinton, MA (US)

(72) Inventors: Amit Lieberman, Kfar Saba (IL); Leehod Baruch, Herzliya (IL); Assaf Natanzon, Tel Aviv (IL); Jehuda Shemer, Kfar Saba (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 131 days.

(21) Appl. No.: 15/198,230

(22) Filed: Jun. 30, 2016

(51) Int. Cl.
*G06F 9/46* (2006.01)
*G06F 9/4401* (2018.01)
*G06F 11/36* (2006.01)

(52) U.S. Cl.
CPC ........ *G06F 9/4411* (2013.01); *G06F 11/3664* (2013.01); *G06F 11/3696* (2013.01)

(58) Field of Classification Search
CPC . G06F 9/4411; G06F 11/3664; G06F 11/3696
See application file for complete search history.

(56) References Cited

U.S. PATENT DOCUMENTS

| 7,228,546 B1 * | 6/2007 | McCarthy | G06F 9/5061 718/103 |
| 2011/0307901 A1 * | 12/2011 | Blanding | G06F 9/5061 718/104 |
| 2017/0249193 A1 * | 8/2017 | Brech | G06F 9/5038 |

* cited by examiner

*Primary Examiner* — Camquy Truong
(74) *Attorney, Agent, or Firm* — Womble Bond Dickinson (US) LLP

(57) ABSTRACT

One embodiment is related to a method for determining an optimal resource configuration combination, comprising: (1) measuring performance of an application with a production resource configuration combination and its associated cost; (2) simulating historical workloads associated with the application with one or more candidate resource configuration combinations using idle resources; (3) selecting one of the candidate resource configuration combinations as a new production resource configuration combination based on cost and performance measurements and comparisons; (4) applying the new production resource configuration combination to a production environment; and (5) monitoring performance of the application with the new production resource configuration combination to confirm that it meets desired performance targets, wherein operations (1) to (5) are performed on a Platform as a Service (PaaS) platform.

30 Claims, 3 Drawing Sheets

IMPLEMENTING CONTINUES PAAS APPS RESOURCE OPTIMIZATION USING PRODUCTION WORKLOAD REPLAY WITH INTELLIGENT CONFIGURATION PERMUTATIONS

FIELD OF THE INVENTION

The disclosure relates generally to cloud computing and more particularly relates to resource configurations on a Platform as a Service (PaaS) platform.

BACKGROUND

Platform as a service (PaaS) is a category of cloud computing services that provides a platform allowing customers to develop, run, and manage applications without the complexity of building and maintaining the infrastructure typically associated with developing and launching an application. An example of a PaaS platform is Cloud Foundry. A customer of a PaaS need only focus on the application and data, leaving the tasks associated with building and maintaining any infrastructure below to the platform.

The integration points between a PaaS platform and the application code are well-defined for applications that are designed to run on the PaaS platform, allowing automation of development processes that used to be manual in nature. The development processes that can be automated include application scaling and new version deployment, etc.

The functionality of a PaaS platform may comprise the ability to create a snapshot, or a copy, of a customer application and data with associated application configurations, runtime settings, and other metadata at an arbitrary point in time. Such a copy, which includes all the information about the application state and data, can be replayed to recreate workloads of a historical point in time.

Although adjusting resource allocations on a PaaS platform is relatively easy with either software containers or virtual templates, determining the appropriate resources that should be reserved for an application may be a complex task. There may be a great number of possible combinations of resource configurations. A trade-off exists between performance and cost. Not reserving enough resources may lead to application performance degradation, while reserving more than enough resources may be costly to the customer. Moreover, the resource demands of the application may vary with time.

For example, one may need to answer the following questions in determining the optimal resource configurations for an application. 1) Is it better to run a 30-node cluster with less random-access memory (RAM) and less processing power (either per-node or combined) or a 10-node cluster with more RAM and more processing power, in terms of throughput as well as cost? 2) Which database service plan or key value store (e.g., Amazon S3 "Simple Storage Service") service plan meets the desired user responsiveness while also keeping the cost low? 3) What cache hit-ratio achieves the desired balance between response time and cost? A method or system for automating the process of resource configuration optimization may bring about great cost savings and performance improvements.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
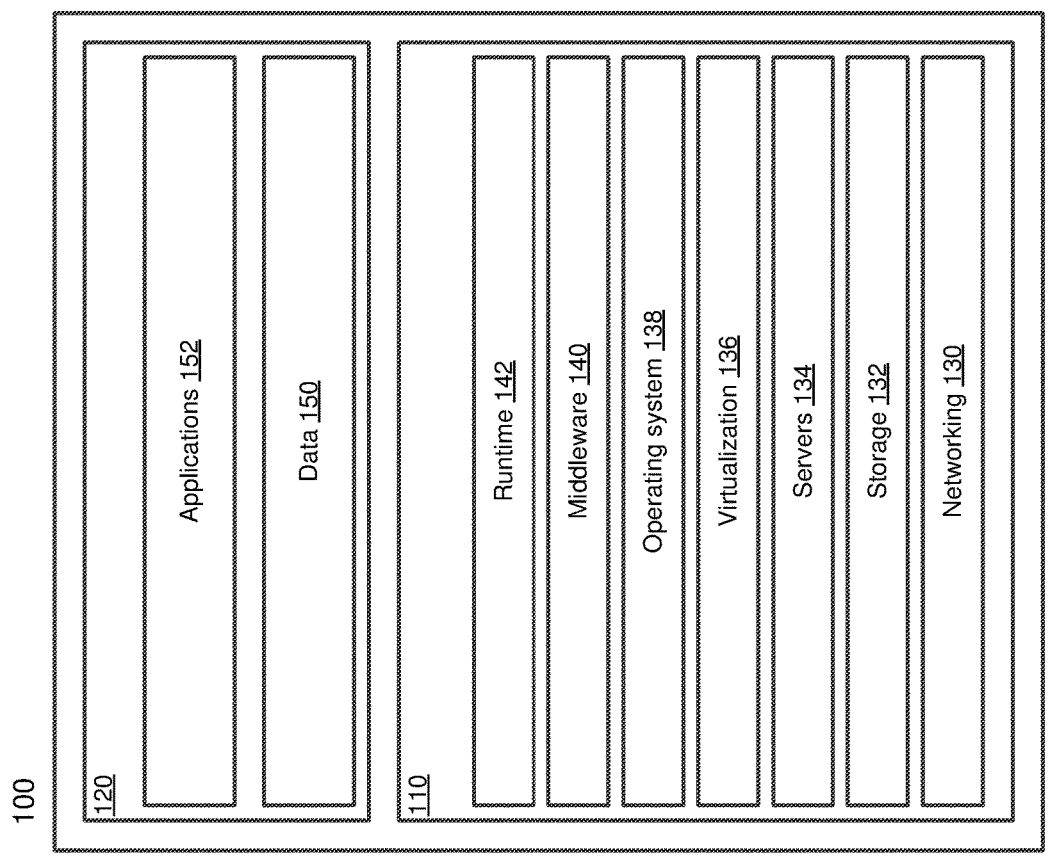
FIG. 1 is a block diagram illustrating an example PaaS platform according to one embodiment of the invention.

Referring to FIG. 1, a block diagram illustrating an example PaaS platform 100 according to one embodiment of the invention is shown. The PaaS platform comprises platform-managed components 110 and customer-managed components 120. As can be seen in FIG. 1, the platform managed components 110 comprise networking 130, storage 132, servers 134, virtualization 136, operating system 138, middleware 140, and runtime 142. The customer-managed components 120 comprise data 150 and applications 152.

Embodiments of the disclosure aim to optimize resource consumption of both stateless and stateful services that are part of an application for both cost and performance by simulating historical workloads on multiple configuration combinations using idle infrastructure resources (processing power, RAM, storage space, etc.).

In addition to the ability to save and replay multiple historical application workloads, embodiments of the disclosure further utilize the following features commonly found on PaaS platforms. 1) Performance for workloads on application components can be automatically measured and recorded. 2) Multiple application components can be automatically deployed in isolated spaces utilizing idle resources. 3) Applications can be automatically reconfigured to connect to different data sources. 4) Resources allocated to each application component can be automatically adjusted with either software containers or virtual templates. 5) The cost associated with a particular resource configuration combination (e.g., the cost for a particular combination of processing power, RAM, storage space, number of nodes, etc.) can be automatically calculated.

Each resource configuration may be application-specific or service-specific. An application may comprise one or more services. There can be great variability with different configurations. An application may share a database service with another application. In another example, multiple services may share a virtual machine (e.g., a node). In yet another example, a service may have a dedicated virtual machine (e.g., a node). In still another example, a service may span across several virtual machines (e.g., nodes). Therefore, a resource configuration combination may specify at least one resource configuration for the application. A resource configuration combination may also specify at least one resource configuration for at least one service.

In some embodiments, a resource configuration combination may also specify one or more services selected from a group of services that have the same or similar functionality and are therefore interchangeable to an extent. For example, a first resource configuration combination may specify a first database service, while a second resource configuration combination may specify a second database service, etc. Examples of services that may be specified in a resource configuration combination may include Structured Query Language (SQL) databases such as Oracle Database, MySQL, PostgreSQL, non SQL (NoSQL) databases such as Cassandra, MongoDB, Amazon DynamoDB, and messaging services such as RabbitMQ.

Changing a resource configuration combination (either for testing or for production) may require data migration in some instances. For example, if a change of the resource configuration combination results in a change of a database service, data migration may be required. In other instances, data migration may not be required. Examples may include changing processing power, RAM, storage space, number of nodes, etc., for a stateless service (e.g., a microservice running the application).

Figure 2:
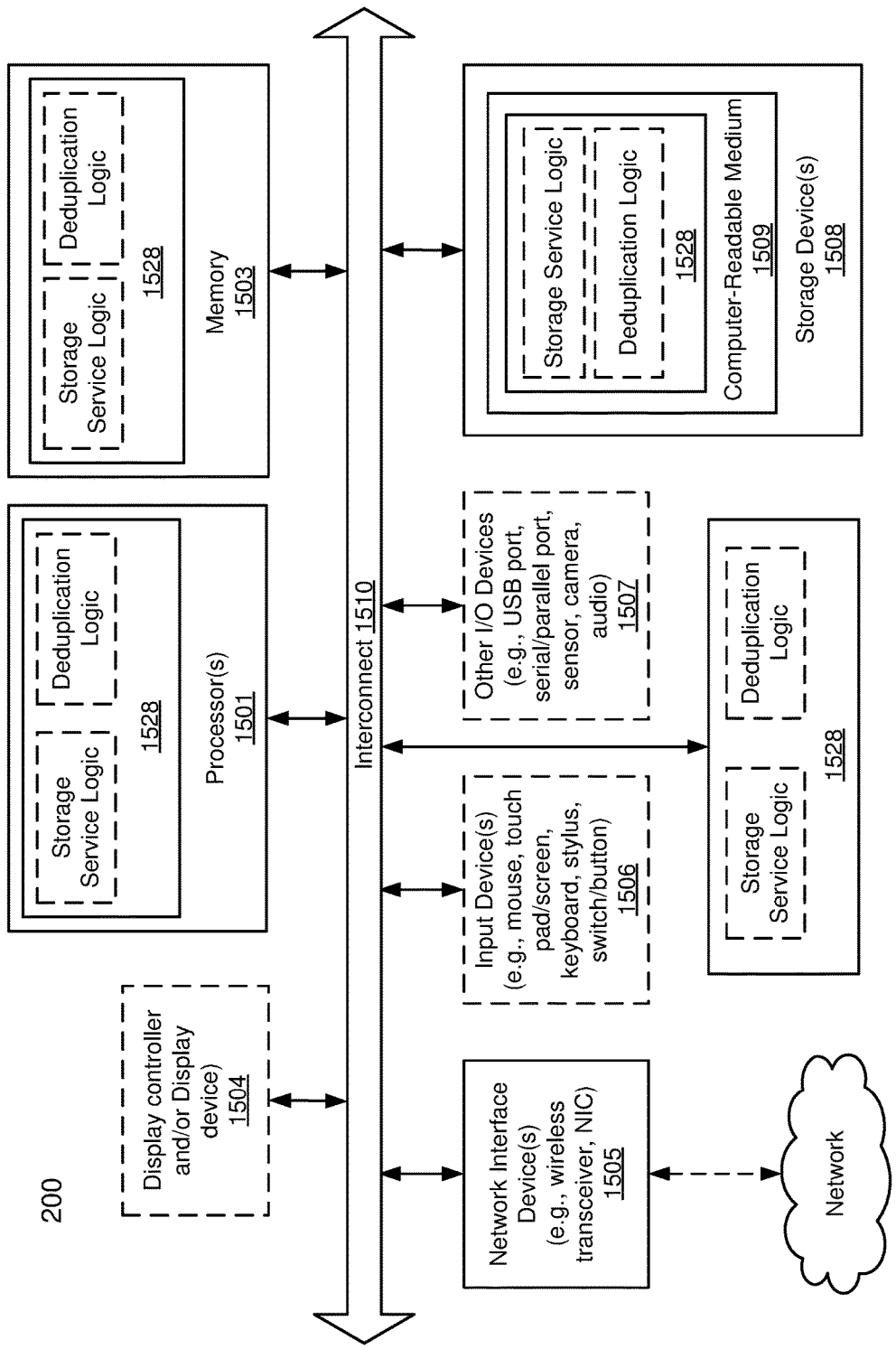
FIG. 2 is a block diagram illustrating an example data processing system according to one embodiment of the invention.

FIG. 2 is a block diagram illustrating an example data processing system 200 according to one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Figure 3:
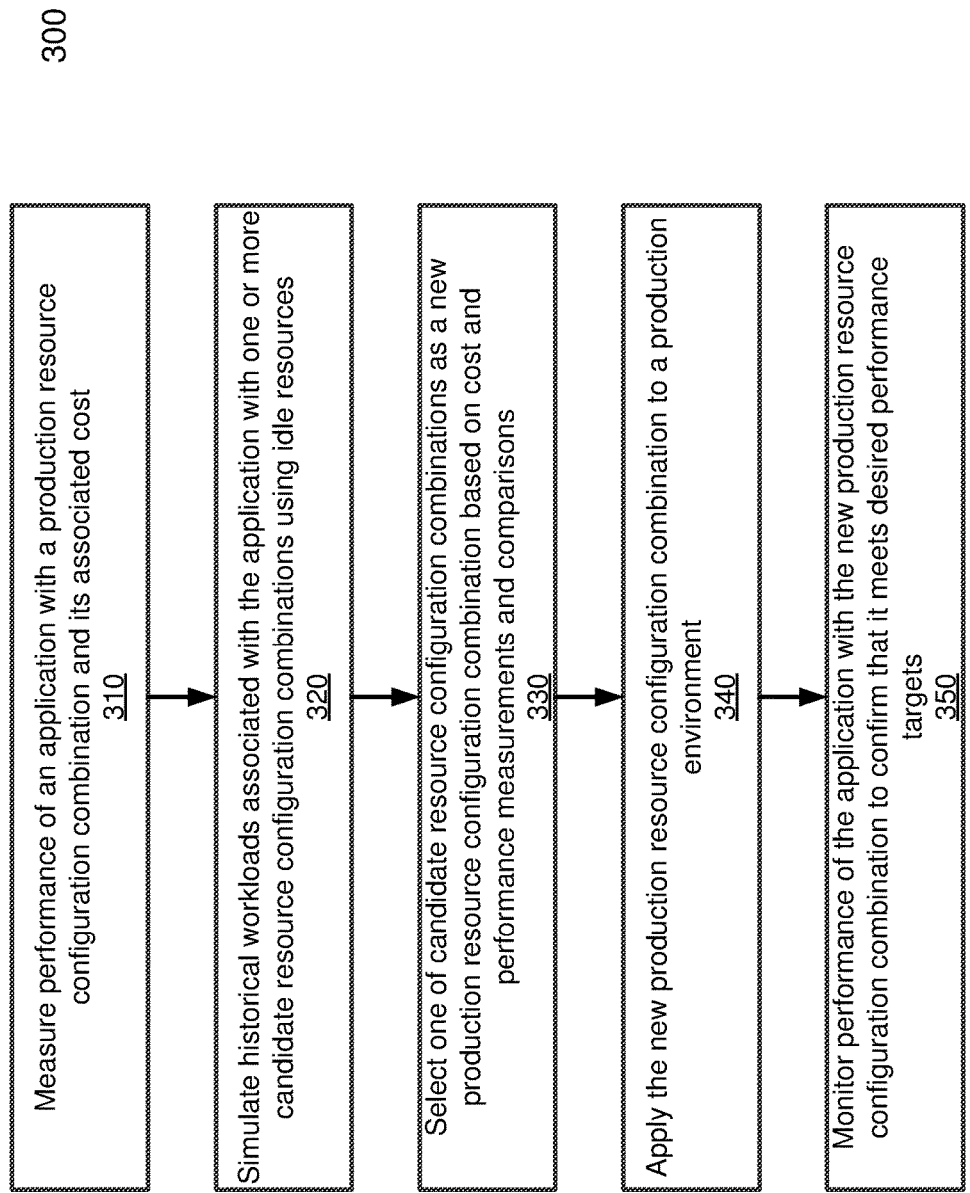
FIG. 3 is a flow diagram illustrating an example method for determining an optimal resource configuration combination according to one embodiment of the invention.

Referring to FIG. 3, a flowchart illustrating an example method 300 for determining an optimal resource configuration combination is shown. At block 310, performance of an application with a production resource configuration combination and its associated cost may be measured. At block 320, historical workloads associated with the application may be simulated with one or more candidate resource configuration combinations using idle resources. It should be appreciated that the application activities (e.g., inputs to the application) may be recorded from time to time so that workloads may be later simulated. At block 330, one of the candidate resource configuration combinations may be selected as a new production resource configuration combination. The selection may be made based on cost and performance measurements and comparisons. The selected candidate resource configuration combination may have a better cost/performance trade-off than the current production resource configuration combination. At block 340, the new production resource configuration combination may be applied to a production environment. At block 350, performance of the application with the new production resource configuration combination may be monitored to confirm that it meets desired performance targets. All operations of the method 300 may be performed automatically. Further, the operations of the method 300 may be continuously or periodically repeated to ensure that the production environment always utilizes the optimal resource configuration combination. New historical workloads may be included in the simulation at block 320 as they become available, so that the optimal resource configuration combination may reflect changing resource demands.

In one embodiment, a user may specify at least some of the desired performance targets. While some metrics, such as the cost of running a service, the throughput of pull and acknowledgement messages from the queue, or minimum/maximum/average response time for hypertext transfer protocol (HTTP) requests, etc., are universal, there may also be metrics that are specifically meaningful according to the context of the application. Therefore, certain performance targets for certain services within an application may be user-configurable. The user may specify one or more performance metrics and targets (e.g., a minimum, a maximum, an average, a range, etc.), and the performance targets specified by the user may guide the selection of the optimal production resource configuration combination. For example, the user may configure the maximum allowed HTTP response time (or related subsets of resources) for end-user-facing services because the HTTP response time is related to user responsiveness. As another example, performance targets for metrics associated with trading or finance-related services that can lead to business advantages or disadvantages may be user-configurable.

In one embodiment, a user may specify at least some of the variable options within candidate resource configuration combinations. While some options, such as processing power, RAM, storage space, number of nodes, etc., are universal, some options may be application- or service-specific. The user may specify such options using a configuration file or a script. The possibility of such customization gives the user better control over the behavior of the PaaS platform.

In one embodiment, a user may specify performance targets for one or more particular workloads. Some workloads may be outlying in terms of their demands for resources but represent critical scenarios such as a particular busy time or intense event-driven user activities. Therefore, such workloads can be very important to the customer and a resource configuration combination should be able to meet the specified performance targets for these workloads before being put into the production environment.

Method 300 may be performed by processing logic that includes hardware (e.g. circuitry, dedicated logic, etc.), software (e.g., embodied on a non-transitory computer readable medium), or a combination thereof. For example, method 300 may be performed by processor 1501 of FIG. 2. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

One embodiment of the disclosure is related to a data processing system, comprising: a processor; and a memory coupled to the processor storing instructions which, when executed by the processor, cause the processor to perform optimization operations, the operations including: (1) measuring performance of an application with a production resource configuration combination and its associated cost; (2) simulating historical workloads associated with the application with one or more candidate resource configuration combinations using idle resources; (3) selecting one of the candidate resource configuration combinations as a new production resource configuration combination based on cost and performance measurements and comparisons; (4) applying the new production resource configuration combination to a production environment; and (5) monitoring performance of the application with the new production resource configuration combination to confirm that it meets desired performance targets, wherein operations (1) to (5) are performed on a Platform as a Service (PaaS) platform.

Therefore, embodiments of the disclosure leverage the ability of the PaaS platform to automatically replay historical workloads and adjust resource allocations in order to determine and apply an optimal resource configuration combination in terms of both performance and cost to the production environment. At the economy of scale with cloud computing, even small optimizations could have great business implications. Therefore, embodiments of the disclosure can greatly add to the competitiveness of PaaS platforms and their customers alike.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for determining an optimal resource configuration combination, comprising:
   (1) measuring performance of an application with a production resource configuration combination and its associated cost;

(2) simulating historical workloads associated with the application with one or more candidate resource configuration combinations using idle resources;

(3) selecting one of the candidate resource configuration combinations as a new production resource configuration combination based on cost and performance measurements and comparisons;

(4) prior to applying the new production resource configuration combination to a production environment, determining whether the new production resource configuration combination would be able to meet desired performance targets for one or more critical workloads that are associated with a busy time or a set of intense event-driven activities;

(5) applying the new production resource configuration combination to the production environment in response to determining that the new production resource configuration combination would be able to meet the desired performance targets for the one or more critical workloads; and (6) monitoring performance of the application with the new production resource configuration combination to confirm that it meets the desired performance targets, wherein operations (1) to (6) are performed on a Platform as a Service (PaaS) platform.

2. The method of claim 1, wherein a resource configuration combination specifies at least one resource configuration for the application.

3. The method of claim 1, wherein the application comprises one or more services, and a resource configuration combination specifies at least one resource configuration for at least one service.

4. The method of claim 1, wherein operations (1) to (6) are continuously or periodically repeated.

5. The method of claim 1, wherein simulating historical workloads associated with the application comprises simulating new historical workloads as they become available.

6. The method of claim 1, wherein a user specifies at least some of the desired performance targets.

7. The method of claim 1, wherein a user specifies at least one variable option within the candidate resource configuration combinations.

8. The method of claim 1, wherein a user specifies the desired performance targets for one or more particular user-specified workloads.

9. The method of claim 1, wherein a resource configuration combination comprises a resource configuration relating to at least one of: processing power, random access memory (RAM), storage space, or a number of nodes.

10. The method of claim 1, wherein the performance targets comprise a target relating to at least one of: throughput or response time.

11. A non-transitory machine-readable medium having instructions stored therein which, when executed by a processor, cause the processor to perform optimization operations, the operations comprising:

(1) measuring performance of an application with a production resource configuration combination and its associated cost;

(2) simulating historical workloads associated with the application with one or more candidate resource configuration combinations using idle resources;

(3) selecting one of the candidate resource configuration combinations as a new production resource configuration combination based on cost and performance measurements and comparisons;

(4) prior to applying the new production resource configuration combination to a production environment, determining whether the new production resource configuration combination would be able to meet desired performance targets for one or more critical workloads that are associated with a busy time or a set of intense event-driven activities;

(5) applying the new production resource configuration combination to the production environment in response to determining that the new production resource configuration combination would be able to meet the desired performance targets for the one or more critical workloads; and (6) monitoring performance of the application with the new production resource configuration combination to confirm that it meets the desired performance targets, wherein operations (1) to (6) are performed on a Platform as a Service (PaaS) platform.

12. The non-transitory machine-readable medium of claim 11, wherein a resource configuration combination specifies at least one resource configuration for the application.

13. The non-transitory machine-readable medium of claim 11, wherein the application comprises one or more services, and a resource configuration combination specifies at least one resource configuration for at least one service.

14. The non-transitory machine-readable medium of claim 11, wherein operations (1) to (6) are continuously or periodically repeated.

15. The non-transitory machine-readable medium of claim 11, wherein simulating historical workloads associated with the application comprises simulating new historical workloads as they become available.

16. The non-transitory machine-readable medium of claim 11, wherein a user specifies at least some of the desired performance targets.

17. The non-transitory machine-readable medium of claim 11, wherein a user specifies at least one variable option within the candidate resource configuration combinations.

18. The non-transitory machine-readable medium of claim 11, wherein a user specifies the desired performance targets for one or more particular user-specified workloads.

19. The non-transitory machine-readable medium of claim 11, wherein a resource configuration combination comprises a resource configuration relating to at least one of: processing power, random access memory (RAM), storage space, or a number of nodes.

20. The non-transitory machine-readable medium of claim 11, wherein the performance targets comprise a target relating to at least one of: throughput or response time.

21. A data processing system, comprising:

a processor; and a memory coupled to the processor storing instructions which, when executed by the processor, cause the processor to perform optimization operations, the operations including (1) measuring performance of an application with a production resource configuration combination and its associated cost;

(2) simulating historical workloads associated with the application with one or more candidate resource configuration combinations using idle resources;

(3) selecting one of the candidate resource configuration combinations as a new production resource configuration combination based on cost and performance measurements and comparisons;

(4) prior to applying the new production resource configuration combination to a production environment, determining whether the new production resource configuration combination would be able to meet desired performance targets for one or more critical workloads that are associated with a busy time or a set of intense event-driven activities;

(5) applying the new production resource configuration combination to the production environment in response to determining that the new production resource configuration combination would be able to meet the desired performance targets for the one or more critical workloads; and (6) monitoring performance of the application with the new production resource configuration combination to confirm that it meets the desired performance targets, wherein operations (1) to (6) are performed on a Platform as a Service (PaaS) platform.

22. The data processing system of claim 21, wherein a resource configuration combination specifies at least one resource configuration for the application.

23. The data processing system of claim 21, wherein the application comprises one or more services, and a resource configuration combination specifies at least one resource configuration for at least one service.

24. The data processing system of claim 21, wherein operations (1) to (6) are continuously or periodically repeated.

25. The data processing system of claim 21, wherein simulating historical workloads associated with the application comprises simulating new historical workloads as they become available.

26. The data processing system of claim 21, wherein a user specifies at least some of the desired performance targets.

27. The data processing system of claim 21, wherein a user specifies at least one variable option within the candidate resource configuration combinations.

28. The data processing system of claim 21, wherein a user specifies the desired performance targets for one or more particular user-specified workloads.

29. The data processing system of claim 21, wherein a resource configuration combination comprises a resource configuration relating to at least one of: processing power, random access memory (RAM), storage space, or a number of nodes.

30. The data processing system of claim 21, wherein the performance targets comprise a target relating to at least one of: throughput or response time.

* * * * *